US011299081B2

(12) United States Patent
Lee et al.

(10) Patent No.: US 11,299,081 B2
(45) Date of Patent: Apr. 12, 2022

(54) MULTIFUNCTION FOOTREST APPARATUS FOR VEHICLE

(71) Applicants: Hyundai Motor Company, Seoul (KR); KIA Motors Corporation, Seoul (KR); Hyundai Transys Inc., Seosan-si (KR)

(72) Inventors: Hong Heui Lee, Suwon-si (KR); Dae Ig Jung, Suwon-si (KR); Eun Sue Kim, Ansan-si (KR); Seung Hyeok Chang, Suwon-si (KR); Byoung Wan Bae, Hwaseong-si (KR); Seong Bin Jeong, Yongin-si (KR); Sin Jeong Kang, Hwaseong-si (KR); Duk Kyu Byun, Gunpo-si (KR)

(73) Assignees: Hyundai Motor Company; KIA Motors Corporation; Hyundai Transys Inc.

( * ) Notice: Subject to any disclaimer, the term of this patent is extended or adjusted under 35 U.S.C. 154(b) by 375 days.

(21) Appl. No.: 16/382,536

(22) Filed: Apr. 12, 2019

(65) Prior Publication Data
US 2020/0156525 A1    May 21, 2020

(30) Foreign Application Priority Data

Nov. 19, 2018   (KR) ........................ 10-2018-0142287

(51) Int. Cl.
*B60N 3/06*     (2006.01)
*B60N 2/90*     (2018.01)
(Continued)

(52) U.S. Cl.
CPC ............ *B60N 3/063* (2013.01); *A61H 9/0078* (2013.01); *A61H 39/04* (2013.01); *B60N 2/32* (2013.01);
(Continued)

(58) Field of Classification Search
CPC .......... B60N 3/063; B60N 3/06; B60N 2/976; B60N 2/32; B60N 2/995; A61H 9/0078;
(Continued)

(56) References Cited

U.S. PATENT DOCUMENTS

| 5,447,359 A | * | 9/1995 | Asbjornsen | B60N 3/06 297/423.35 |
| 6,045,192 A | * | 4/2000 | Faulise | A47C 16/02 297/423.1 |

(Continued)

FOREIGN PATENT DOCUMENTS

| EP | 3 075 603 A1 | 10/2016 | |
| JP | 2012170609 A | * 9/2012 | ............. A61F 7/007 |
| KR | 10-2006-0007915 | 1/2006 | |

OTHER PUBLICATIONS

Extended European Search Report for Application No. 19169316.7, dated Nov. 18, 2019, 7 pgs.

*Primary Examiner* — Timothy A Stanis
*Assistant Examiner* — Matthew R Moon
(74) *Attorney, Agent, or Firm* — Lempia Summerfield Katz LLC

(57) ABSTRACT

A multifunction footrest apparatus for a vehicle is provided in a space in which a passenger seat is positioned so as to be movable in a front-rear direction. The multifunction footrest apparatus may be inserted into and housed in a lower space under a dashboard including a glove box, and it may perform a massage and an acupressure for calves and soles of a back seat passenger by using a lower door including a first massage device and an upper door including a second massage device and an acupressure plate.

12 Claims, 15 Drawing Sheets

(51) Int. Cl.
  *A61H 9/00* (2006.01)
  *A61H 39/04* (2006.01)
  *B60N 2/32* (2006.01)
(52) U.S. Cl.
  CPC .............. *B60N 2/976* (2018.02); *B60N 3/06* (2013.01); *A61H 2201/0157* (2013.01); *A61H 2201/0192* (2013.01); *A61H 2201/1238* (2013.01); *A61H 2201/1409* (2013.01); *A61H 2201/1642* (2013.01); *A61H 2201/1683* (2013.01); *A61H 2201/501* (2013.01); *A61H 2203/0431* (2013.01); *A61H 2205/125* (2013.01)
(58) Field of Classification Search
  CPC ............ A61H 39/04; A61H 2201/0157; A61H 2201/0192; A61H 2201/1238; A61H 2201/1409; A61H 2201/1642; A61H 2201/1683; A61H 2201/501; A61H 2203/0431; A61H 2205/125
  See application file for complete search history.

(56) References Cited

U.S. PATENT DOCUMENTS

| | | | |
|---|---|---|---|
| 2002/0091344 A1* | 7/2002 | Thomas | A61H 9/0078 601/148 |
| 2004/0034314 A1* | 2/2004 | Kobayashi | B60N 3/063 601/5 |
| 2004/0209739 A1* | 10/2004 | Lammers | A61F 13/067 482/51 |
| 2008/0143137 A1* | 6/2008 | Bowen | B60N 3/063 296/75 |
| 2010/0244504 A1* | 9/2010 | Colja | A61H 9/0078 297/180.1 |
| 2010/0244534 A1* | 9/2010 | Driessen | B64D 11/0649 297/423.35 |
| 2011/0009780 A1* | 1/2011 | Chen | A61H 1/024 601/100 |
| 2013/0038107 A1* | 2/2013 | Tamura | B60N 2/067 297/331 |
| 2018/0343971 A1* | 12/2018 | Aggarwal | A43B 7/147 |

* cited by examiner

MULTIFUNCTION FOOTREST APPARATUS FOR VEHICLE

CROSS REFERENCE TO RELATED APPLICATION

This application claims priority to and the benefit of Korean Patent Application No. 10-2018-0142287, filed on Nov. 19, 2018, which is incorporated herein by reference in its entirety.

FIELD

The present disclosure relates to a multifunction footrest apparatus in a vehicle as a convenience device for a passenger.

BACKGROUND

The statements in this section merely provide background information related to the present disclosure and may not constitute prior art.

An autonomous vehicle is a smart vehicle that incorporates an autonomous driving technology that allows the vehicle to reach to its destination even in a case in which a driver does not directly manipulate a steering wheel, an accelerator pedal, and a brake. In recent years, the autonomous vehicle has been rapidly developed.

If the autonomous driving situation is universally realized, passengers want to be able to rest in the most comfortable state. As an example, a back seat passenger may want a situation in which the passenger may stretch his/her foot forward and take a rest.

A conventional footrest of a vehicle is a type of footstep that the back seat passenger may simply support his/her foot by placing the foot on the footrest and has a structure in which a rotatable footstep is mounted on a rear portion of a driver seat or a passenger seat. We have discovered that the conventional footrest is not suitable for use in the autonomous vehicle for utilizing its space.

The above information disclosed in this Background section is only for enhancement of understanding of the background of the present disclosure, and therefore it may contain information that does not form the prior art that is already known to a person of ordinary skill in the art.

SUMMARY

The present disclosure provides a multifunction footrest apparatus for a vehicle that is installed in a space in which a passenger seat is positioned so as to be movable in a front-rear direction and may implement a function of massaging calves and feet of a back seat passenger. The footrest apparatus is used by being moved to a rear direction in which the back seat passenger is present, and the footrest apparatus is housed in a lower space under a dashboard and stored when is not used, thereby increasing utilization of an interior space of the vehicle.

According to a form of the present disclosure, a multifunction footrest apparatus for a vehicle having a floor panel and a passenger seat includes a footrest housing installed on the floor panel on which a passenger seat is positioned so as to be movable, a lower door rotatably coupled to the footrest housing and supporting calves of a back seat passenger, and an upper door rotatably coupled to the footrest housing and supporting soles of the back seat passenger.

The multifunction footrest apparatus may further include a first massage device provided on the lower door to massage the calves of the back seat passenger; and a second massage device provided on the upper door to massage the soles of the back seat passenger.

The multifunction footrest apparatus may further include an acupressure plate provided on the upper door and including a plurality of acupressure protrusions to perform an acupressure for the soles of the back seat passenger.

The footrest housing may be installed to be movable in a front-rear direction along a guide rail installed on the floor panel.

The first massage device may include a first pneumatic pump, a first air distributor connected to the first pneumatic pump, a plurality of first distribution hoses connected to the first air distributor, and a plurality of first air cells connected to the first distribution hoses one by one.

The lower door may include a first frame forming a framework, a first form pad coupled to the first frame, and a first cover covering the first frame and the first form pad. The first air distributor may be fixedly installed on the first frame, the first air cells may be positioned between the first form pad and the first cover, the first frame may be rotatably coupled to a main frame forming a framework of the footrest housing through a first shaft, and the first pneumatic pump may be fixedly installed on the main frame.

The second massage device may include a second pneumatic pump, a second air distributor connected to the second pneumatic pump, a plurality of second distribution hoses connected to the second air distributor, and a plurality of second air cells connected to the second distribution hoses one by one.

The upper door may include a second frame forming a framework, and a second cover covering the second frame. The second air distributor may be fixedly installed on the second frame, the second air cells may be positioned inside the second cover, the second frame may be rotatably coupled to a main frame forming a framework of the footrest housing through a second shaft, and the second pneumatic pump may be fixedly installed on the main frame.

The acupressure plate may be placed between the second cover and the second air cells.

The multifunction footrest apparatus may further include a foot cover positioned in the front of the second cover and connected to the second cover through an elastic band. Accordingly, the back seat passenger inserts feet between the second cover and the foot cover and uses the multifunction footrest apparatus.

The footrest housing may be provided with an internal space in which articles are accommodated, and the internal space may be opened and closed by a rotation of the lower door.

A movement of the footrest housing in a front-rear direction, a rotation operation of the lower door and the upper door, and an operation of a first massage device and a second massage device may be driven through a manipulation of applications of a smartphone.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4:
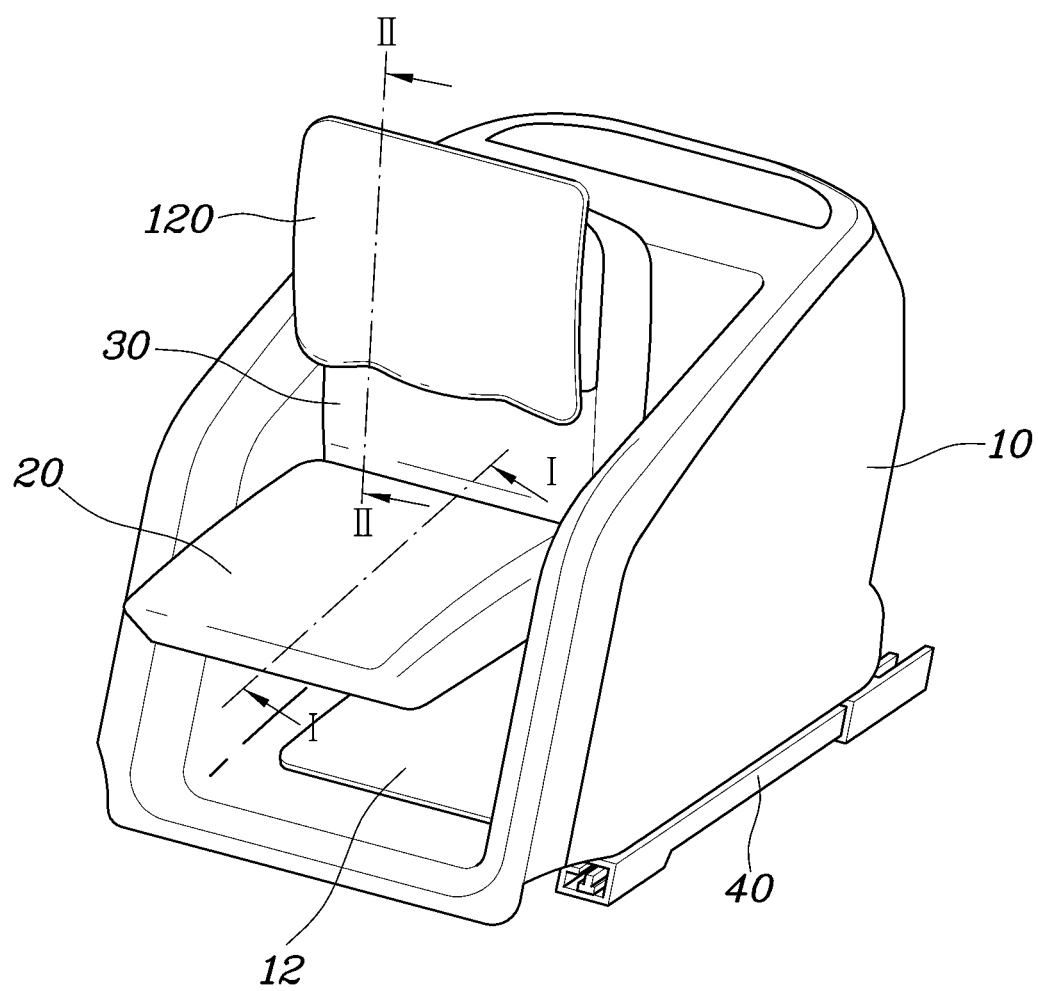
FIG. 4 is a view illustrating a state in which a lower door and an upper door are rotated in FIG. 3.
Figure 6A:
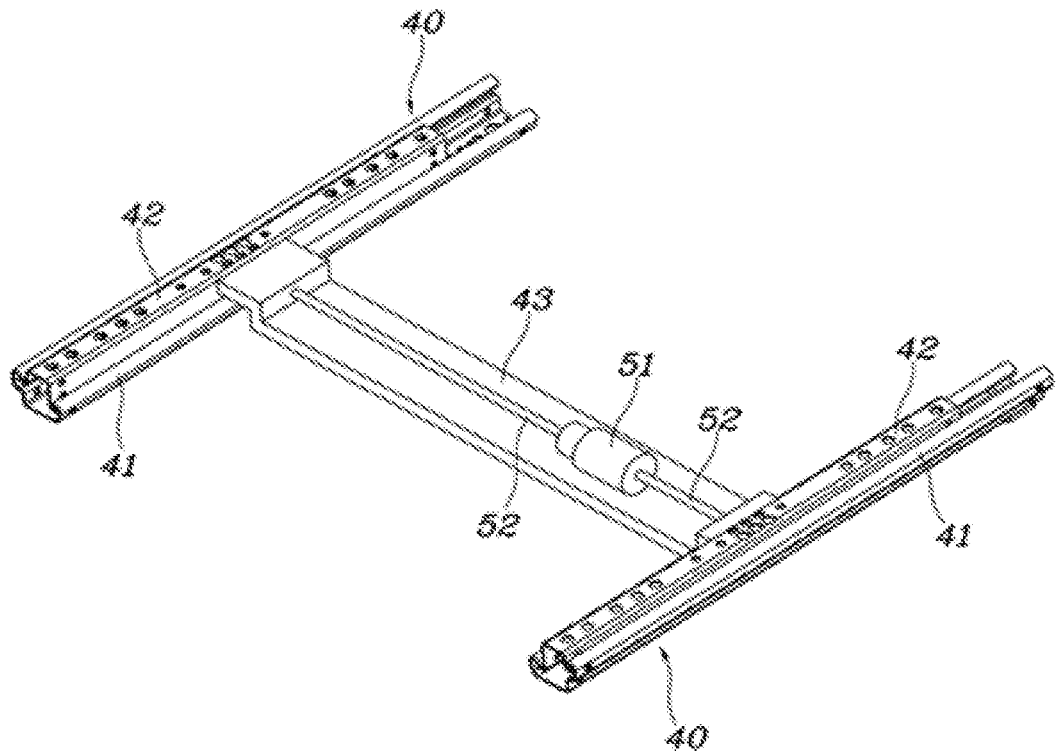
Figure 6B:
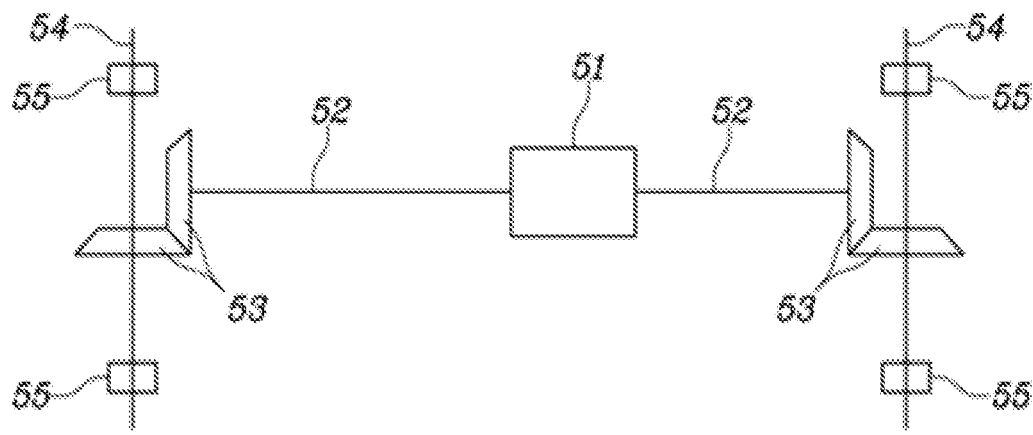
Figure 7:
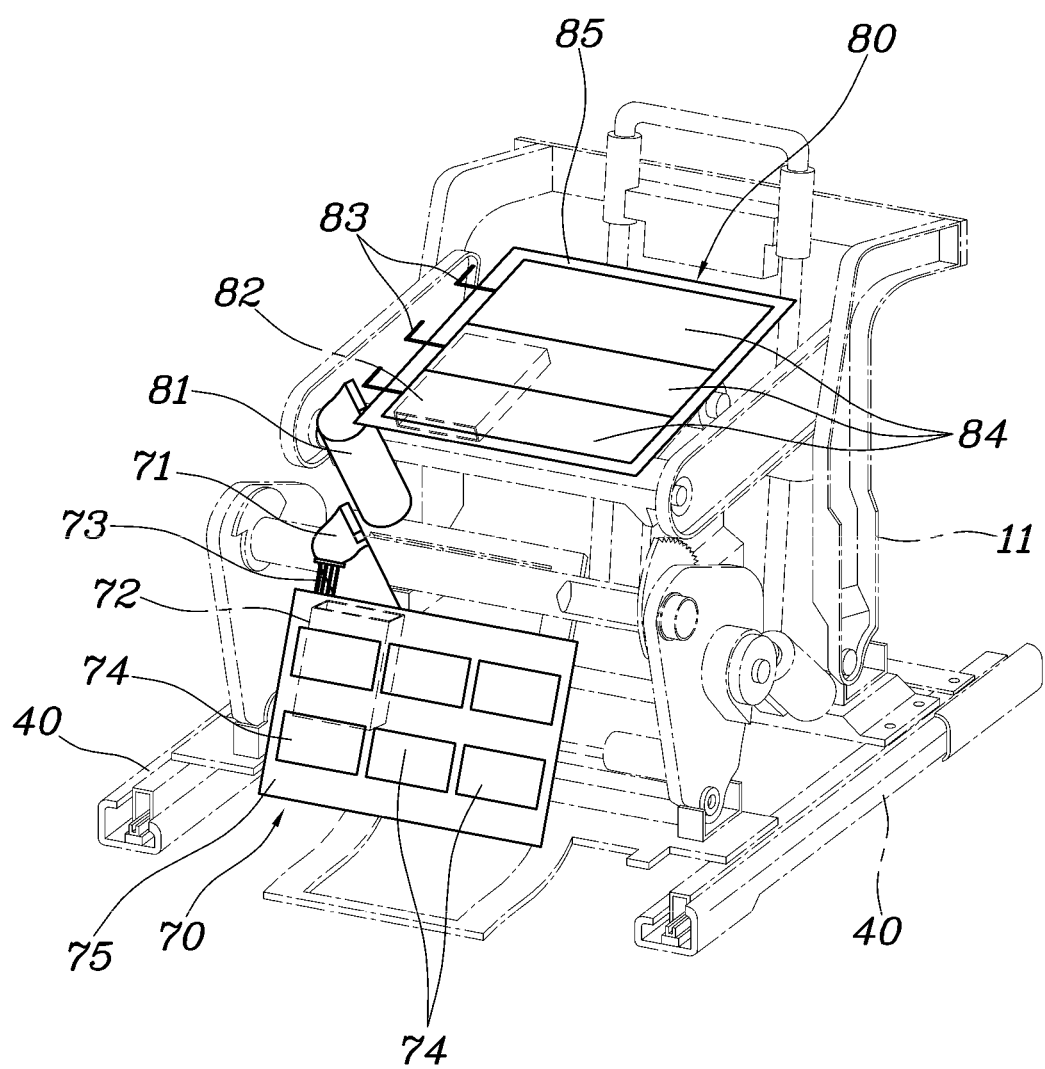
Figure 8:
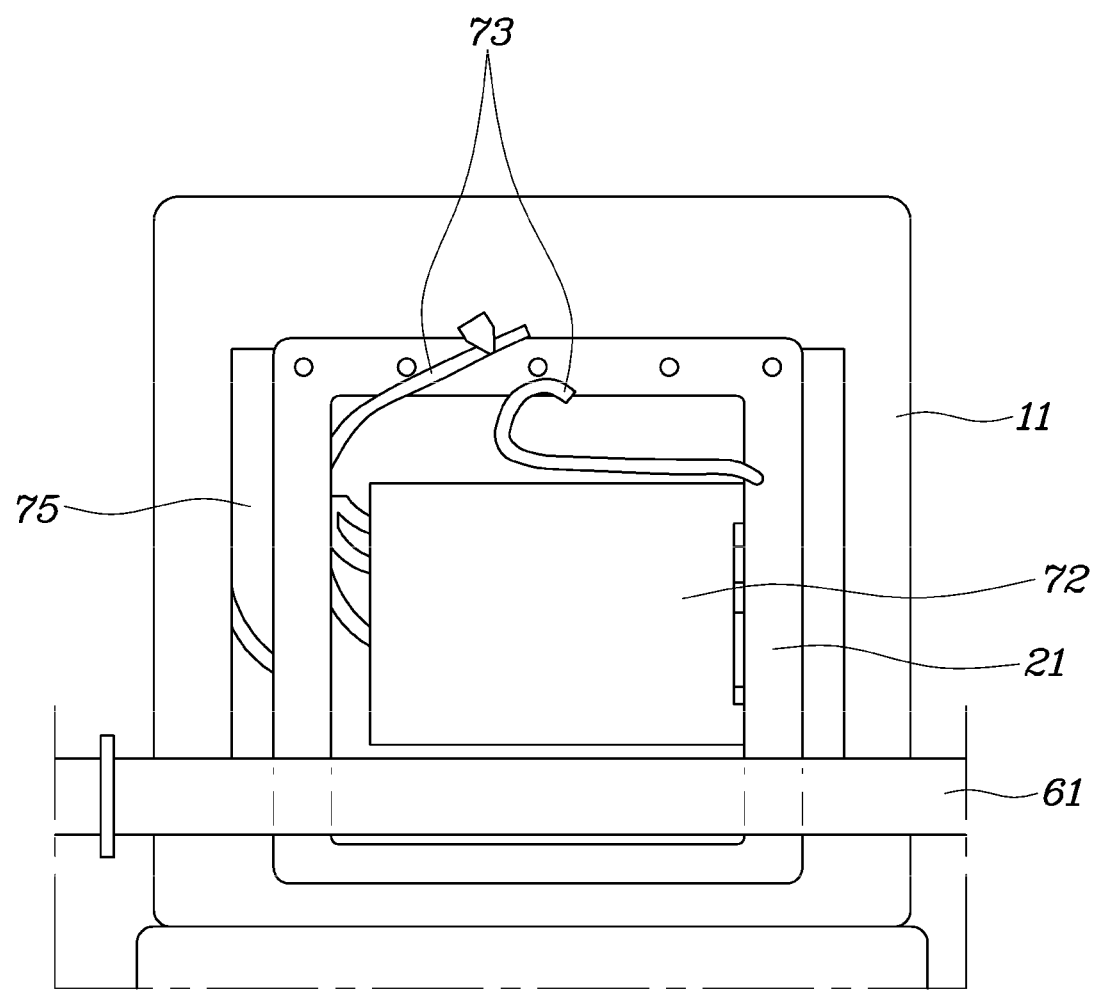
Figure 9:
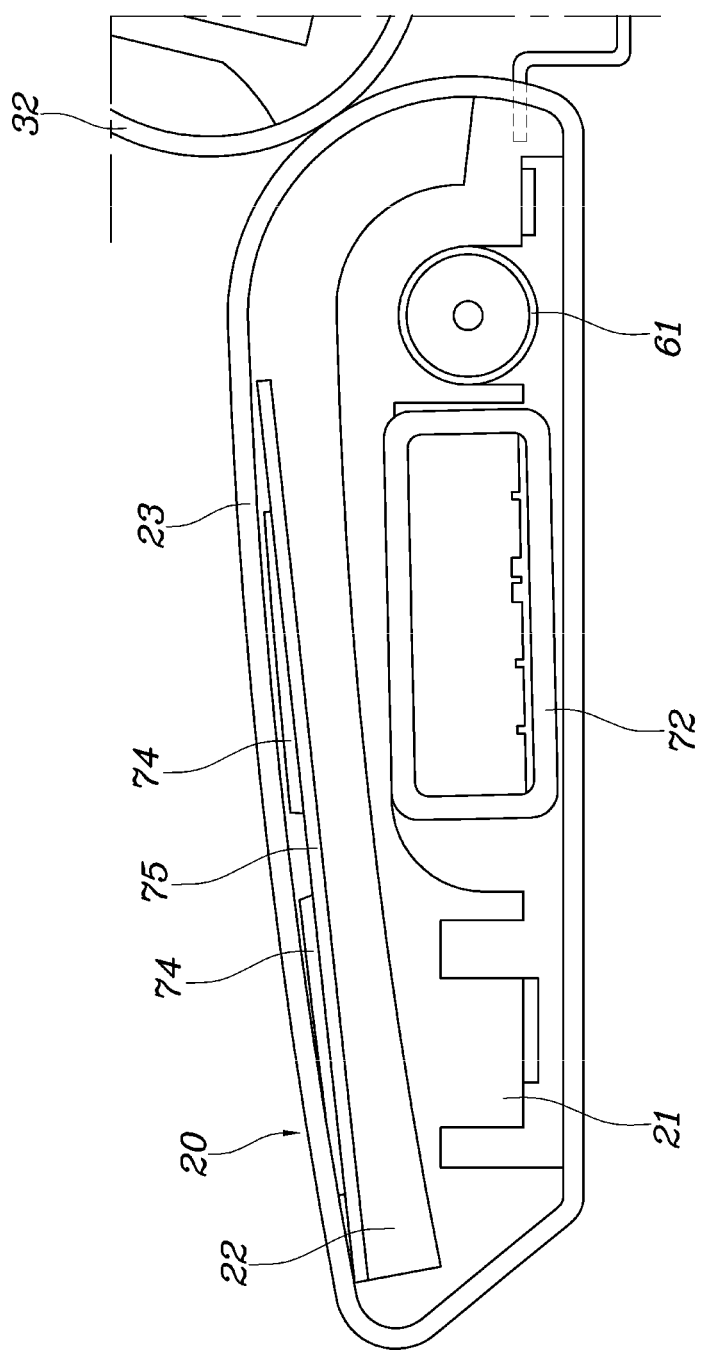
Figure 10:
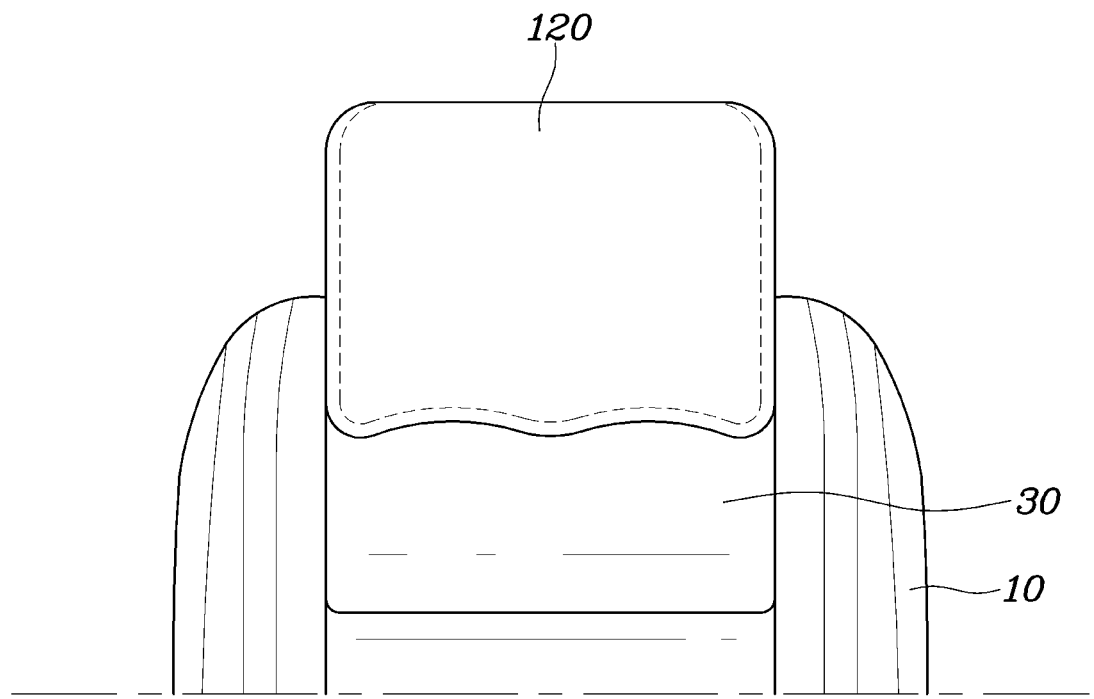
Figure 11:
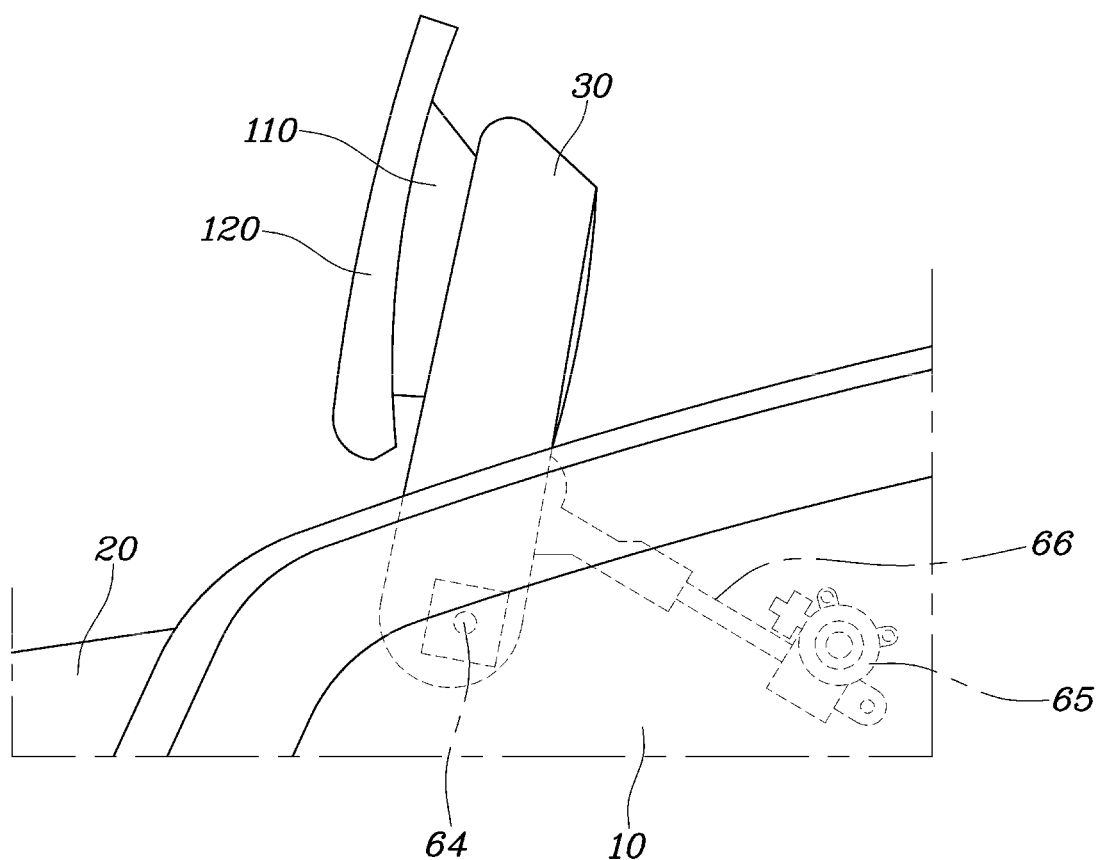
Figure 12:
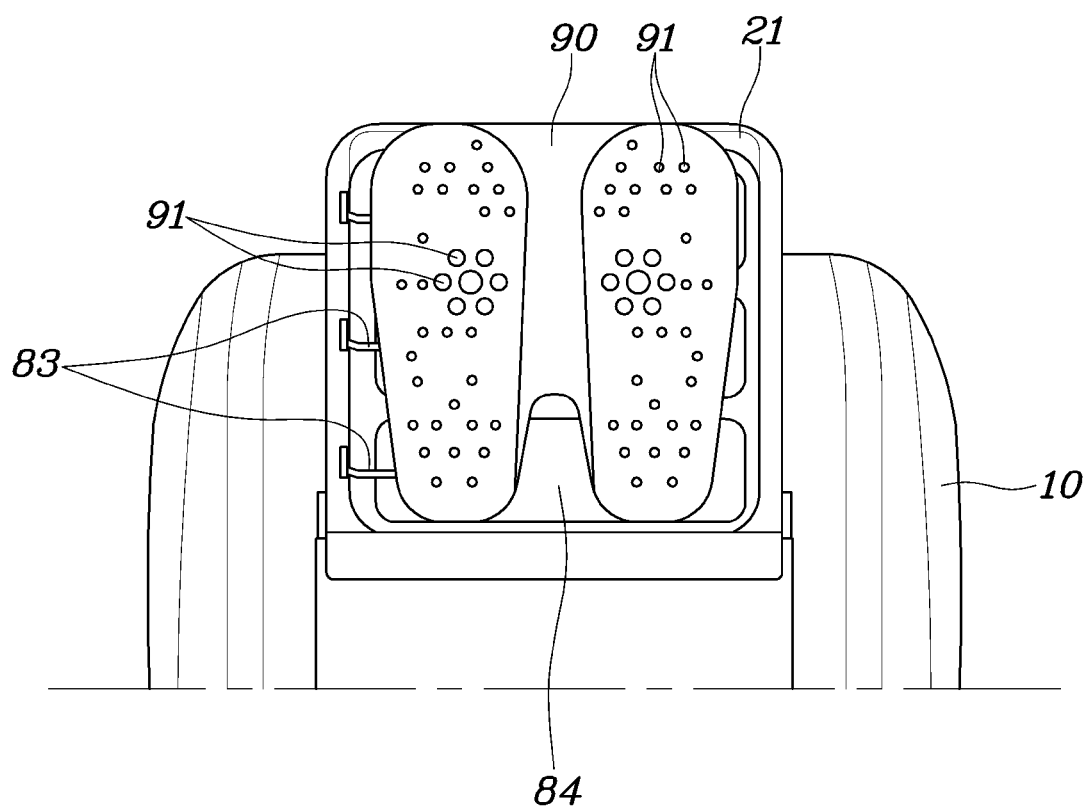
Figure 13:
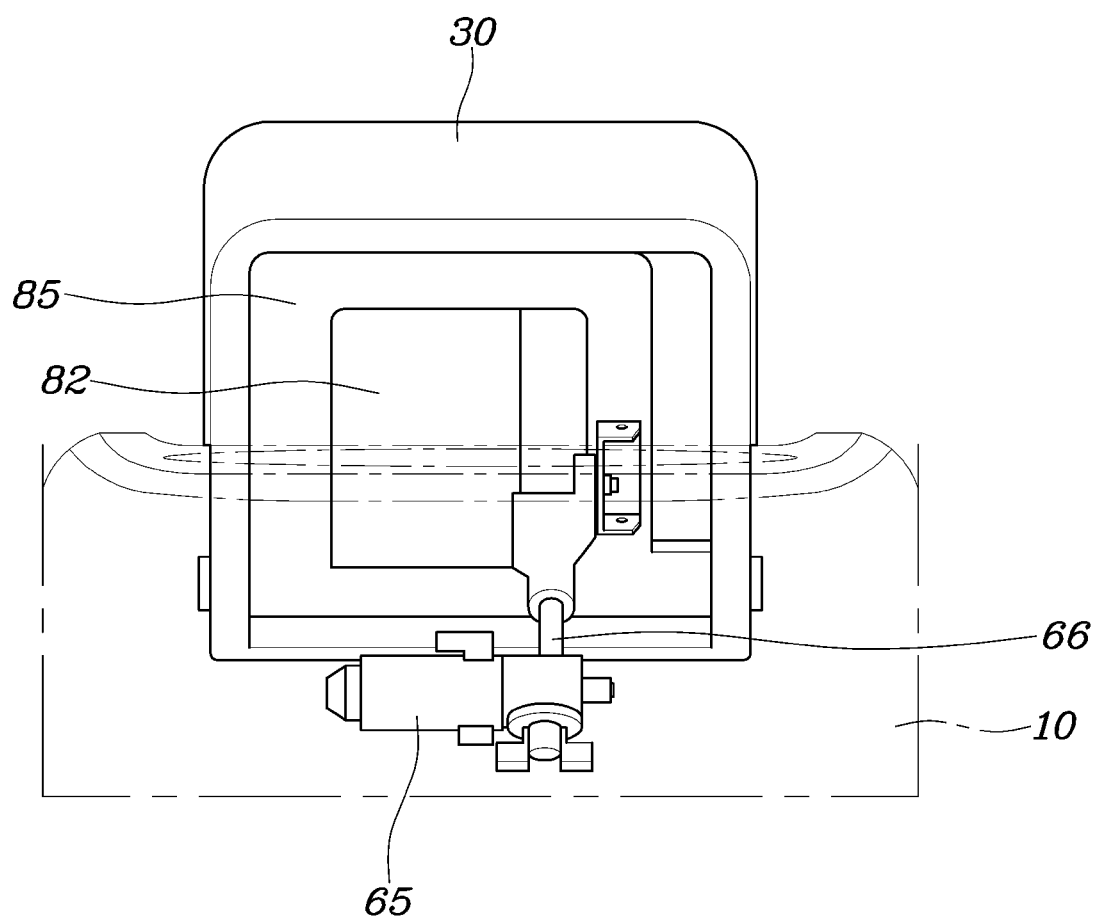
Figure 14:
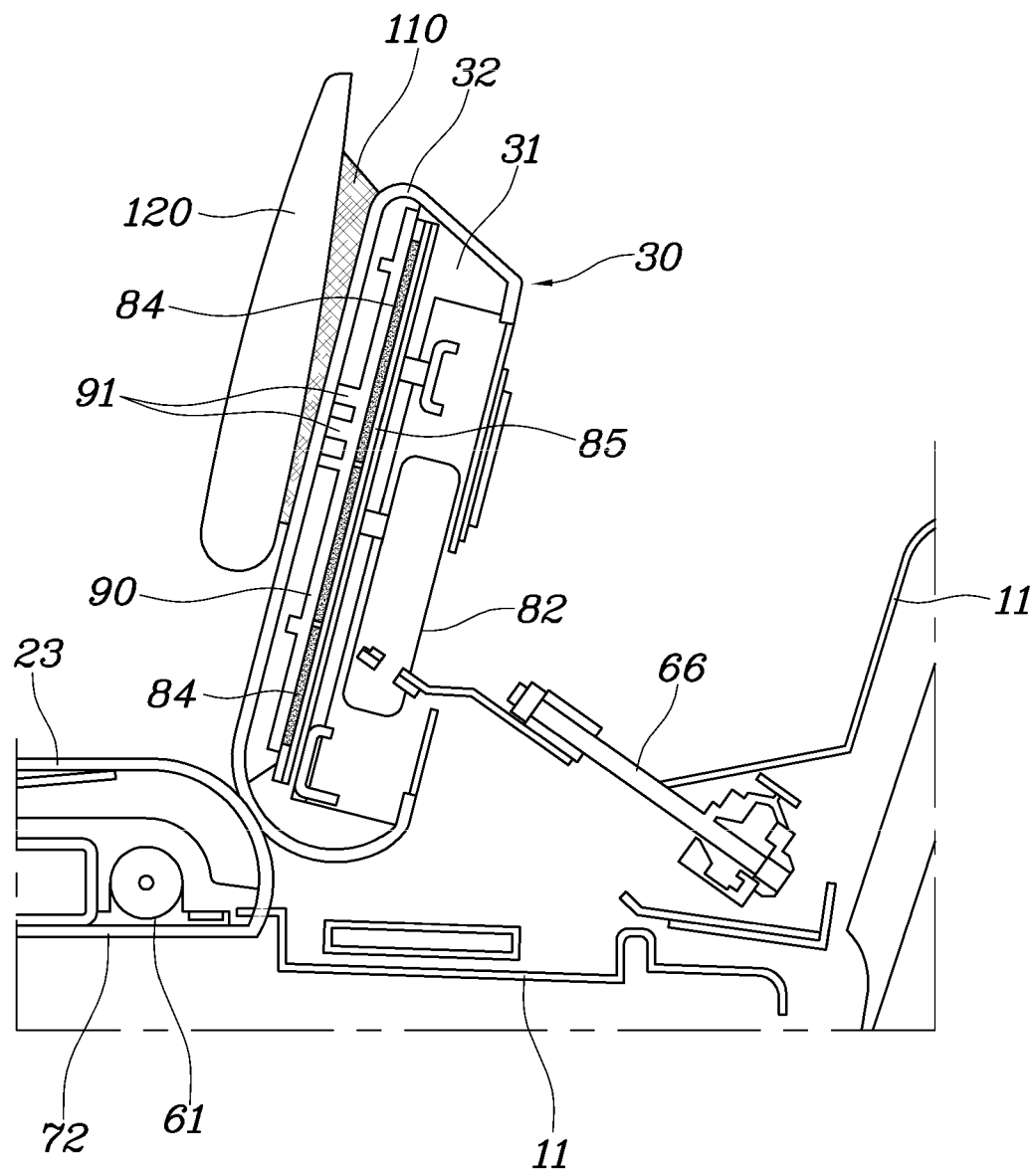
Figure 15:
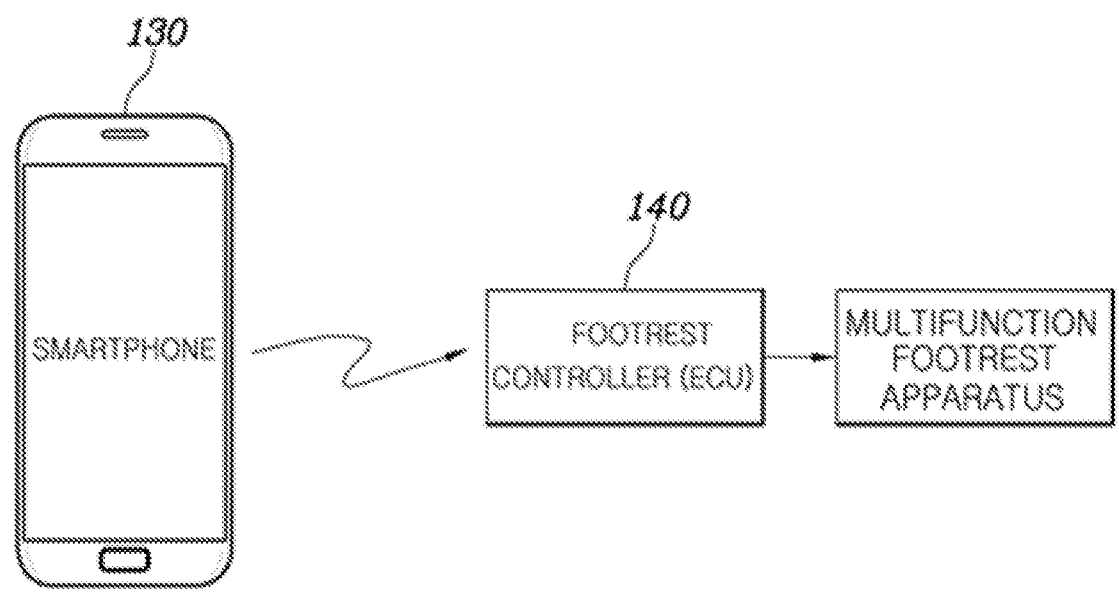

FIG. 6(A) and FIG. 6(B) are schematic views for describing an operation of a guide rail and a footrest housing according to the exemplary form of the present disclosure;

FIG. 7 is a view for describing a first massage device and a second massage device according to an exemplary form of the present disclosure;

FIG. 8 is a rear view of a first plate in FIG. 7;

FIG. 9 is a cross-sectional view taken along line I-I of FIG. 4 for describing the lower door and the first massage device according to the exemplary form of the present disclosure;

FIG. 10 is a front view of the upper door according to the exemplary form of the present disclosure;

FIG. 11 is a side view of FIG. 10;

FIG. 12 is a view illustrating a state in which a second cover is removed in FIG. 10 and is a view for describing an acupressure plate according to an exemplary form of the present disclosure;

FIG. 13 is a rear view of FIG. 10;

FIG. 14 is a cross-sectional view taken along line II-II of FIG. 4 for describing the upper door, the second massage device, and the acupressure plate according to the exemplary form of the present disclosure; and FIG. 15 is a view for describing an operation of a multifunction footrest apparatus utilizing a smartphone.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawing, corresponding reference numerals indicate like or corresponding parts and features.

Figure 1:
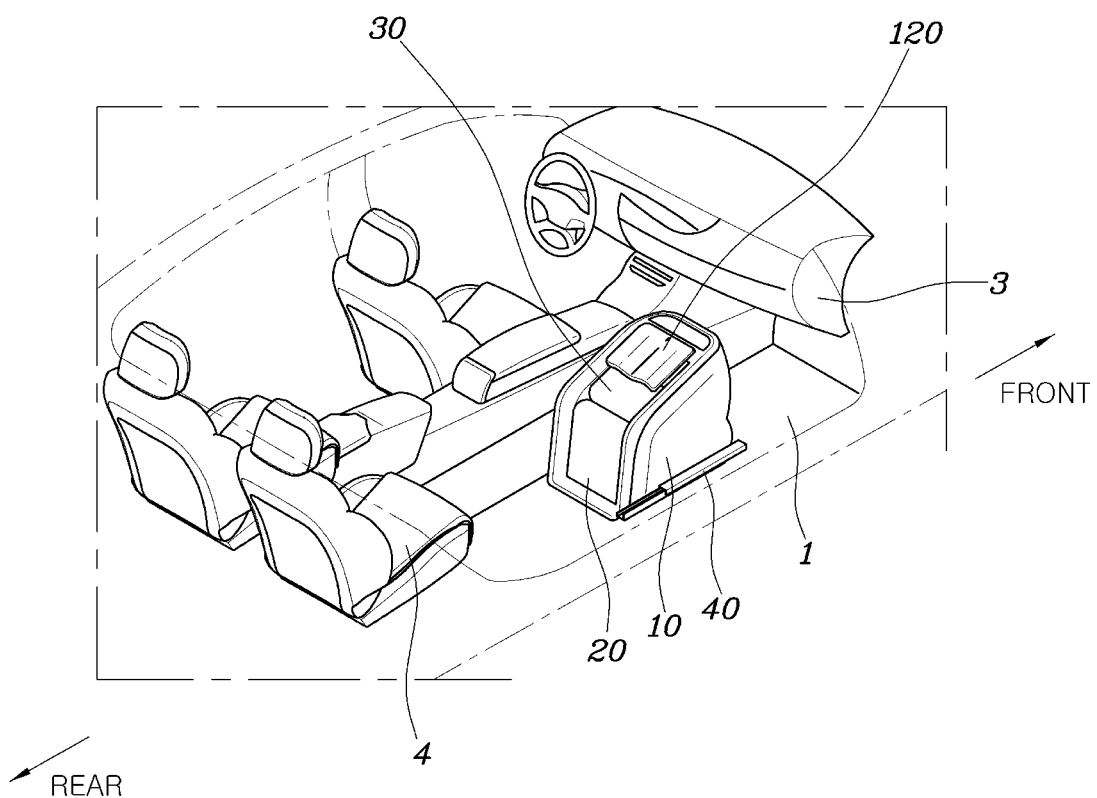
FIG. 1 is a perspective view of a multifunction footrest apparatus installed in a vehicle according to an exemplary form of the present disclosure.
Figure 2:
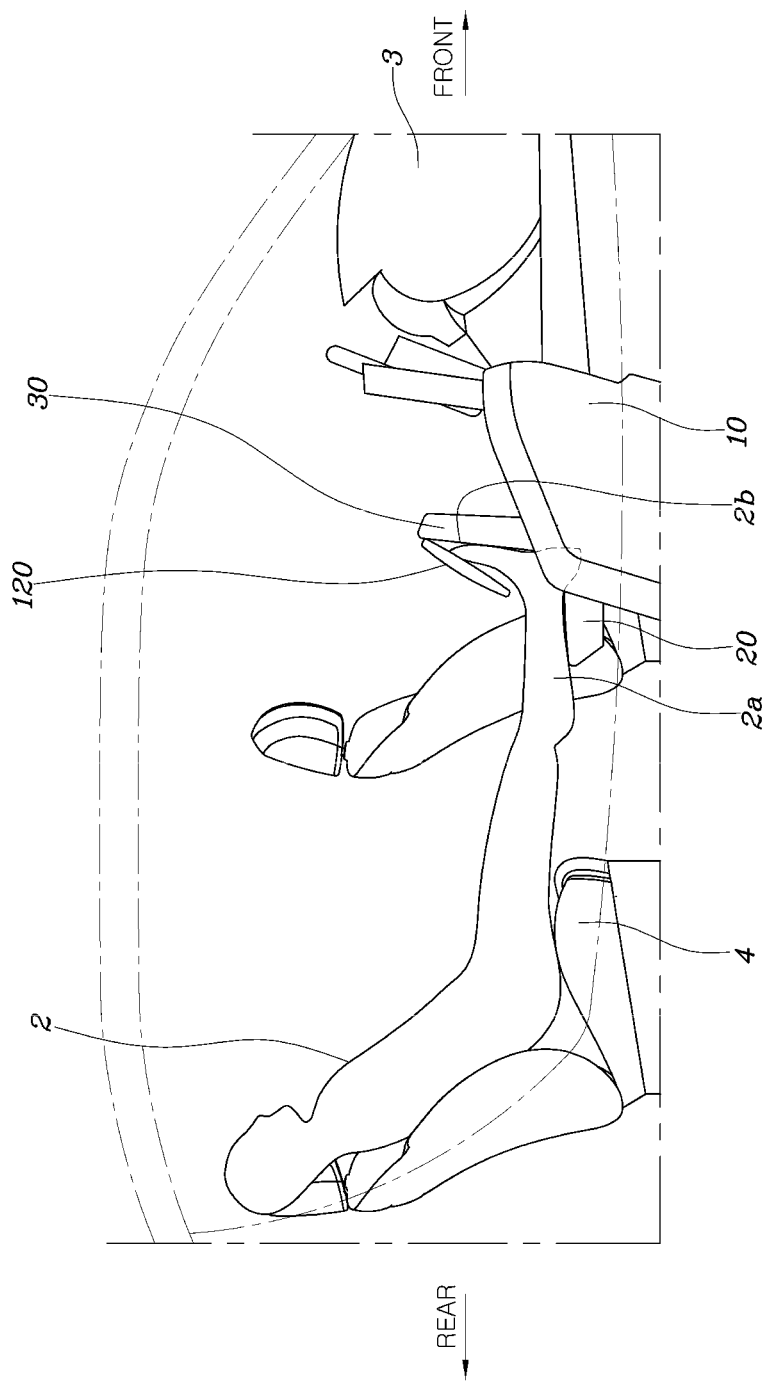
FIG. 2 is a side view of FIG. 1 and is a view for describing a use state by a back seat passenger.
Figure 3:
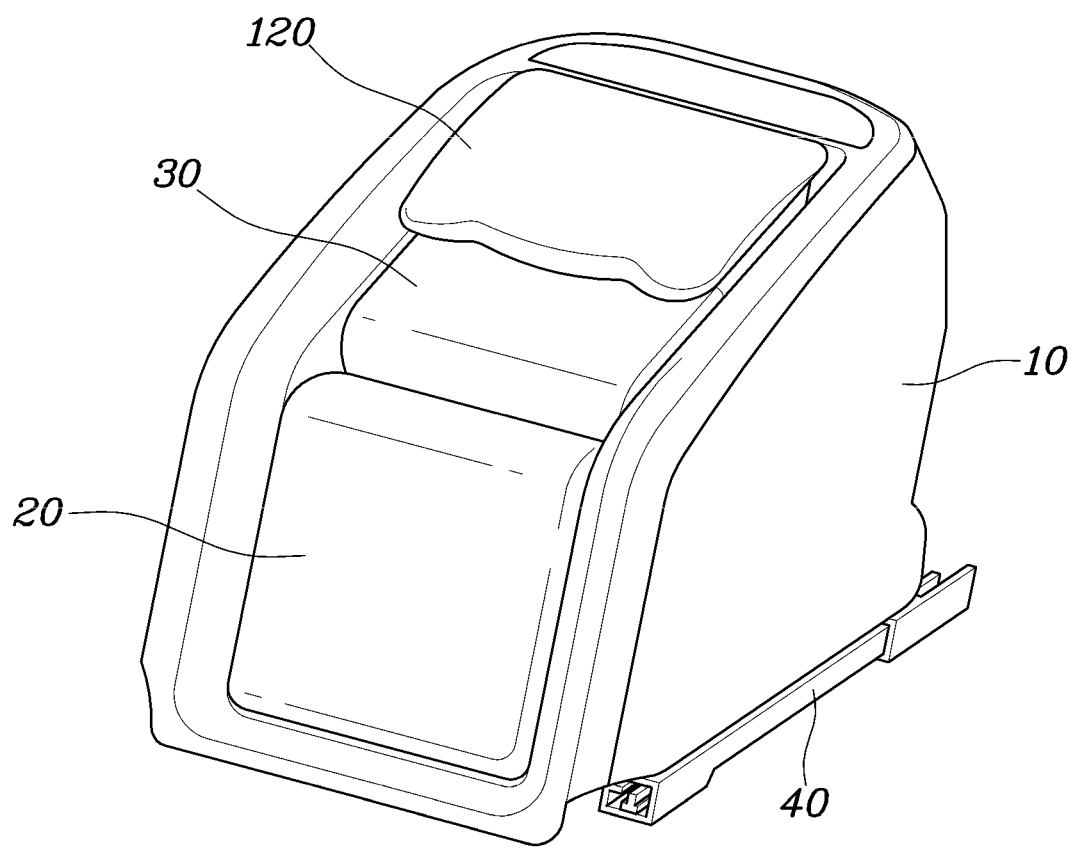
FIG. 3 is a perspective view of the multifunction footrest apparatus of FIG. 1.

Referring to FIGS. 1, 2 and 3, a multifunction footrest apparatus according to an exemplary form of the present disclosure includes a footrest housing 10 installed on a floor panel 1 on which a passenger seat is positioned so as to be movable, a lower door 20 rotatably coupled to the footrest housing 10 and supporting calves 2a of a back seat passenger 2, and an upper door 30 rotatably coupled to the footrest housing 10 and supporting soles 2b of the back seat passenger 2.

The footrest housing 10 is installed to be movable in a front-rear direction along a guide rail 40 installed on the floor panel 1.

A front end of the guide rail 40 may be installed to extend up to a lower space under a dashboard 3 in which a glove box is installed, and a rear end of the guide rail 40 may be installed to extend to the vicinity of the front of a rear seat 4. Therefore, when the footrest housing 10 is moved forwardly to the front end along the guide rail 40, the footrest housing 10 is housed by placing in the lower space under the dashboard 3, and the footrest housing 10 placed in the lower space under the dashboard 3 does not protrude to an interior space of the vehicle. Since the interior space of the vehicle may be effectively utilized through the above-mentioned structure, the multifunction footrest apparatus may also be installed in an autonomous vehicle.

As shown in FIG. 2, when the footrest housing 10 is moved backward, the back seat passenger 2 may seat the calves 2a and the soles 2b using the lower door 20 and the upper door 30.

A movement of the footrest housing 10 forward and backward along the guide rail 40 may be implemented by an electric type using power of a motor.

Figure 5:
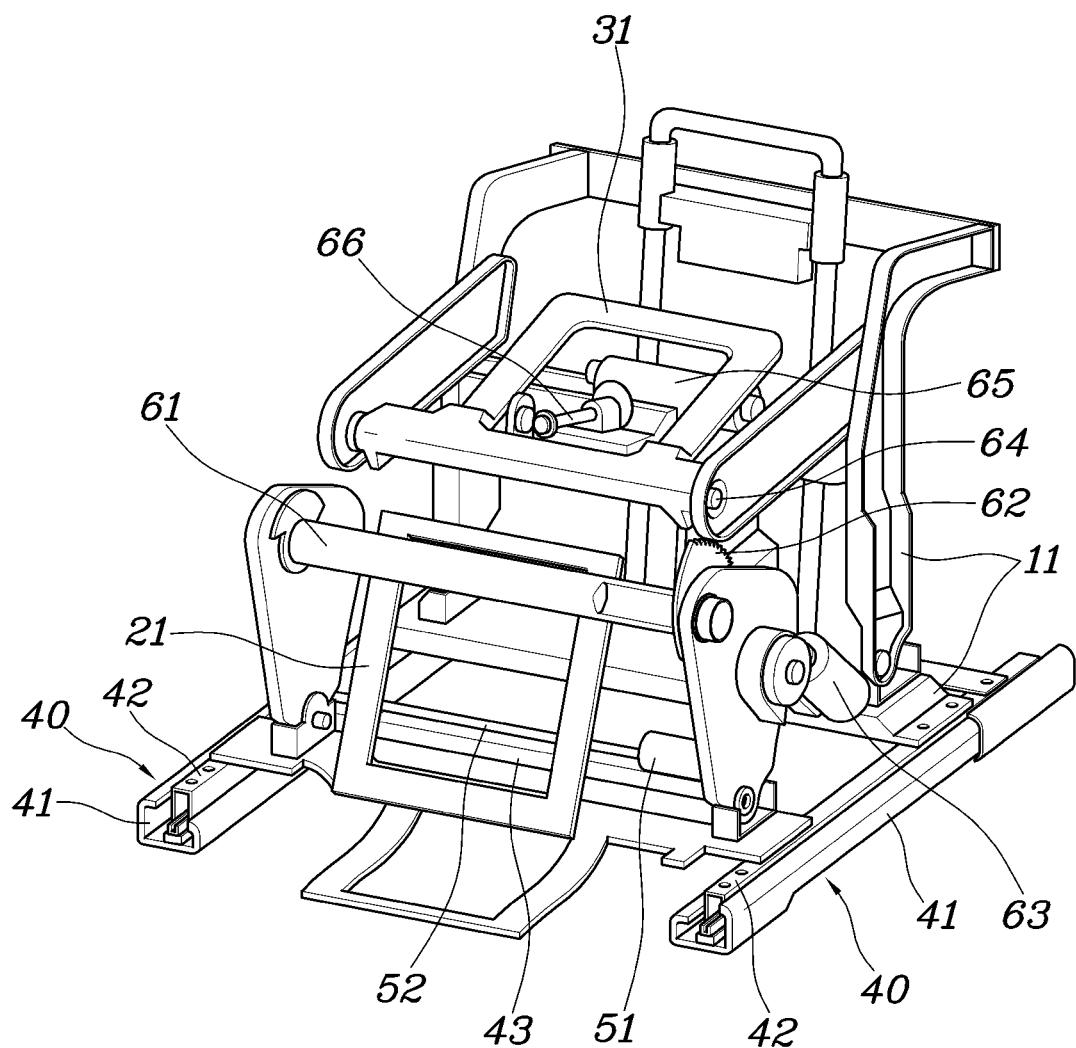
FIG. 5 is a view for describing a frame structure according to the exemplary form of the present disclosure.

Referring to FIG. 5, the guide rail 40 includes a fixed rail 41 fixedly installed to extend forward and backward on the floor panel 1 on which the passenger seat is positioned, and a moving rail 42 moving along the fixed rail 41. The moving rail 42 is coupled to a main frame 11 forming a framework of the footrest housing 10.

Referring to FIGS. 6(A) and 6(B), the guide rails 40 are configured as a pair disposed in parallel while being spaced apart from each other in a left-right (lateral) direction for stable movement of the footrest housing 10, and the left and right moving rails 42 are connected to each other through a connecting bracket 43.

A first motor 51 is fixedly coupled to the connecting bracket 43, and first lead screws 52 are connected to the first motor 51 and protruded to both ends of the first motor 51. As shown in FIG. 6(B), bevel gears 53 are coupled to both ends of the first lead screw 52, respectively, and second lead screws 54 are coupled to rotatably pass through the bevel gears 53. In addition, the second lead screws 54 are fixedly installed on the fixed rails 41, and nuts 55 are rotatably coupled to the second lead screws 54 and the nuts 55 are fixedly coupled to the moving rails 42.

Therefore, when the first motor 51 is driven, the power is transmitted through the first lead screws 52 and the bevel gears 53 to rotate the second lead screws 54. By the transmitted power, the nuts 55 are moved along the second lead screws 54 by the rotation of the second lead screws 54, and as the moving rails 42 coupled to the nuts 55 and the main frame 11 coupled to the moving rails 42 are moved by the movement of the nuts 55, the footrest housing 10 may be moved in a front-rear direction.

Referring back to FIG. 5, the lower door 20 includes a first frame 21 forming the framework. The first frame 21 is coupled to a first shaft 61, which is coupled to the main frame 11 forming the framework of the footrest housing 10 for being axially rotatable. The first shaft 61 is also connected to a second motor 63 through a gear member 62, and the second motor 63 is fixed to the main frame 11.

Therefore, when the second motor 63 is driven, the power is transmitted through the gear member 62 to rotate the first shaft 61 with respect to the main frame 11, and the first frame 21 coupled to the first shaft 61 is rotated by the rotation of the first shaft 61. As a result, the lower door 20 is rotated with respect to the footrest housing 10.

As shown in FIGS. 4 and 5, the upper door 30 includes a second frame 31 forming a framework. The second frame 31 is coupled to a second shaft 64, which is coupled to the main frame 11 forming the framework of the footrest housing 10 for being axially rotatable. A third motor 65 is fixedly coupled to the main frame 11, and a third lead screw 66 connected to the third motor 65 is connected to the second frame 31.

Therefore, when the third motor 65 is rotated, the third lead screw 66 moves forward or backward, the second shaft 64 is rotated with respect to the main frame 11 by the movement of the third lead screw 66, and the second frame 31 coupled to the second shaft 64 is rotated by the rotation of the second shaft 64. As a result, the upper door 30 is rotated with respect to the footrest housing 10.

Referring to FIGS. 7, 12 and 14, the multifunction footrest apparatus according to a form of the present disclosure further includes a first massage device 70 provided on the lower door 20 to massage the calves 2a of the back seat passenger 2, a second massage device 80 provided on the upper door 30 to massage the soles 2b of the back seat passenger 2, and an acupressure plate 90 provided on the upper door 30 and including a plurality of acupressure protrusions 91 to perform an acupressure for the soles 2b of the back seat passenger 2.

In FIGS. 7 and 8, the first massage device 70 includes a first pneumatic pump 71, a first air distributor 72 connected to the first pneumatic pump 71, a plurality of first distribution hoses 73 connected to the first air distributor 72, and a plurality of first air cells 74 connected to the first distribution hoses 73 one by one.

In FIG. 9 illustrating a cross-sectional view taken along line I-I of FIG. 4, the lower door 20 includes the first frame 21 forming the framework, a first form pad 22 coupled to the first frame 21, and a first cover 23 covering the first frame 21 and the first form pad 22.

In addition, the first air distributor 72 is fixedly installed on the first frame 21, the plurality of first air cells 74 are fixedly coupled to a first plate 75, and as the first plate 75 is positioned between the first form pad 22 and the first cover 23, the first air cells 74 are positioned inside the first cover 23.

In FIGS. 5, 7 and 8, the first frame 21 is rotatably coupled to the main frame 11 forming the framework of the footrest housing 10 through the first shaft 61, and the first pneumatic pump 71 is fixedly installed on the main frame 11.

Therefore, as air is injected into or out of the first air cells 74 by driving the first pneumatic pump 71, the plurality of first air cells 74 may massage the calves 2a of the back seat passenger 2 seated on the lower door 20, and particularly, logic for air injection into each first air cell 74 may also be implemented in a variety of ways.

In FIGS. 7, 13 and 14, the second massage device 80 includes a second pneumatic pump 81, a second air distributor 82 connected to the second pneumatic pump 81, a plurality of second distribution hoses 83 connected to the second air distributor 82, and a plurality of second air cells 84 connected to the second distribution hoses 83 one by one.

The upper door 30 includes the second frame 31 forming the framework, and a second cover 32 covering the second frame 31.

In addition, the second air distributor 82 is fixedly installed on the second frame 31, the plurality of second air cells 84 are fixedly coupled to a second plate 85, and as the second plate 85 is positioned between the second frame 31 and the second cover 32, the second air cells 84 are positioned inside the second cover 32.

The second frame 31 is rotatably coupled to the main frame 11 forming the framework of the footrest housing 10 through the second shaft 64, and the second pneumatic pump 81 is fixedly installed on the main frame 11.

In FIGS. 12 and 14, according to the present disclosure, the acupressure plate 90 including the plurality of acupressure protrusions 91 is positioned between the second cover 32 and the second air cell 84.

Therefore, as shown in FIGS. 7 and 12, the air is injected into or out of the second air cells 84 by driving the second pneumatic pump 81, and according to a change in volume of the second air cells 84, the acupressure protrusions 91 of the acupressure plate 90 may effectively perform the acupressure and the massage for the soles 2b of the back seat passenger 2 who is in contact with the upper door 30 (see FIG. 2).

As shown in FIGS. 10, 11 and 14, since the multifunction footrest apparatus according to a form of the present disclosure further includes a foot cover 120 positioned in the front of the second cover 32 and connected to the second cover 32 through an elastic band 110, the back seat passenger 2 inserts his/her feet between the second cover 32 and the foot cover 120 and uses the multifunction footrest apparatus.

The elastic band 110 is configured to pull the foot cover 120 toward the second cover 32. As a result, contact characteristics between the soles 2b of the back seat passenger 2 inserted into the foot cover 120 and the second cover 32 may be further enhanced, thereby more improving an acupressure effect by the acupressure protrusions 91.

As shown in FIG. 4, the footrest housing 10 is provided with an internal space 12 in which articles may be accommodated, and the internal space 12 is opened and closed by the rotation of the lower door 20. It is possible to accommodate and store shoes or various articles in the internal space 12.

Referring to FIG. 15, the multifunction footrest apparatus according to a form of the present disclosure may drive the movement of the footrest housing 10 in the front-rear direction, the rotation operation of the lower door 20 and the upper door 30, and the operation of the first massage device 70 and the second massage device 80 through a manipulation of applications of a smartphone 130.

As shown in FIG. 15, when the application on the smartphone 130 or a tablet PC owned by the passenger is manipulated, a manipulation command is transmitted to a footrest controller 140 of the vehicle through wireless communication, and the multifunction footrest apparatus may be operated by the control of the footrest controller 140. As the driving of the first, second, and third motors 51, 63, and 65, and the driving of the first and second pneumatic pumps 71 and 81 may be controlled, the operation of the multifunction footrest apparatus may be controlled.

According to a form of the present disclosure, the multifunction footrest apparatus used by the back seat passenger is installed in the space in which the passenger seat is positioned so as to be movable in the front-rear direction, and when the footrest apparatus is not used, the footrest apparatus is inserted into the lower space under the dashboard 3 including a glove box and is housed so as not to protrude to the interior space of the vehicle, thereby increasing the utilization of the interior space of the vehicle. As a result, the multifunction footrest apparatus may also be installed in the autonomous vehicle.

In addition, the back seat passenger may massage the calves using the lower door provided with the first massage device, and may perform the massage and acupressure for the soles using the upper door provided with the second massage device and the acupressure plate on which the acupressure protrusions are formed, thereby making is possible to improve convenience of the back seat passenger.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A multifunction footrest apparatus for a vehicle, the multifunction footrest apparatus comprising:
    a footrest housing configured to be installed on a floor panel of the vehicle and further configured to move relative to the floor panel;
    a lower door rotatably coupled to the footrest housing and configured to open and close a front opening of the footrest housing; and
    an upper door rotatably coupled to the footrest housing and configured to open and close an upper opening of the footrest housing,
    wherein:
        the lower door is configured to support calves of a back seat passenger in the vehicle and open the front opening of the footrest housing when rotated,
        the upper door is configured to support soles of the back seat passenger and open the upper opening of the footrest housing when rotated, and
        the lower door is disposed below the upper door and configured to rotate independently of the upper door.

2. The multifunction footrest apparatus of claim 1, further comprising:
    a first massage device provided on the lower door to massage the calves of the back seat passenger; and
    a second massage device provided on the upper door to massage the soles of the back seat passenger.

3. The multifunction footrest apparatus of claim 2, further comprising an acupressure plate provided on the upper door and including a plurality of acupressure protrusions to perform an acupressure for the soles of the back seat passenger.

4. The multifunction footrest apparatus of claim 3, wherein the second massage device includes:
    a second pneumatic pump;
    a second air distributor connected to the second pneumatic pump;
    a plurality of second distribution hoses connected to the second air distributor; and
    a plurality of second air cells connected to the second distribution hoses one by one.

5. The multifunction footrest apparatus of claim 4, wherein the upper door includes a second frame, and a second cover covering the second frame;
    the second air distributor is fixedly installed on the second frame;
    the second air cells are positioned inside the second cover;
    the second frame is rotatably coupled to a main frame forming a framework of the footrest housing through a second shaft; and
    the second pneumatic pump is fixedly installed on the main frame.

6. The multifunction footrest apparatus of claim 5, wherein the acupressure plate is placed between the second cover and the second air cells.

7. The multifunction footrest apparatus of claim 5, further comprising a foot cover positioned in the front of the second cover and connected to the second cover through an elastic band.

8. The multifunction footrest apparatus of claim 2, wherein the first massage device includes:
    a first pneumatic pump;
    a first air distributor connected to the first pneumatic pump;
    a plurality of first distribution hoses connected to the first air distributor; and
    a plurality of first air cells connected to the first distribution hoses one by one.

9. The multifunction footrest apparatus of claim 8, wherein the lower door includes a first frame, a first form pad coupled to the first frame, and a first cover covering the first frame and the first form pad;
    the first air distributor is fixedly installed on the first frame;
    the first air cells are positioned between the first form pad and the first cover;
    the first frame is rotatably coupled to a main frame forming a framework of the footrest housing through a first shaft; and
    the first pneumatic pump is fixedly installed on the main frame.

10. The multifunction footrest apparatus of claim 1, wherein the footrest housing is installed to be movable in a front-rear direction of the vehicle along a guide rail installed on the floor panel.

11. The multifunction footrest apparatus of claim 1, wherein an internal space of the footrest housing is configured to accommodate articles, and
    the lower door is configured to open and close the internal space while rotating.

12. The multifunction footrest apparatus of claim 1, wherein a movement of the footrest housing in a front-rear direction, a rotation operation of the lower door and the upper door, and an operation of a first massage device and a second massage device are driven through a manipulation of applications of a smartphone.

* * * * *